Figure 4:
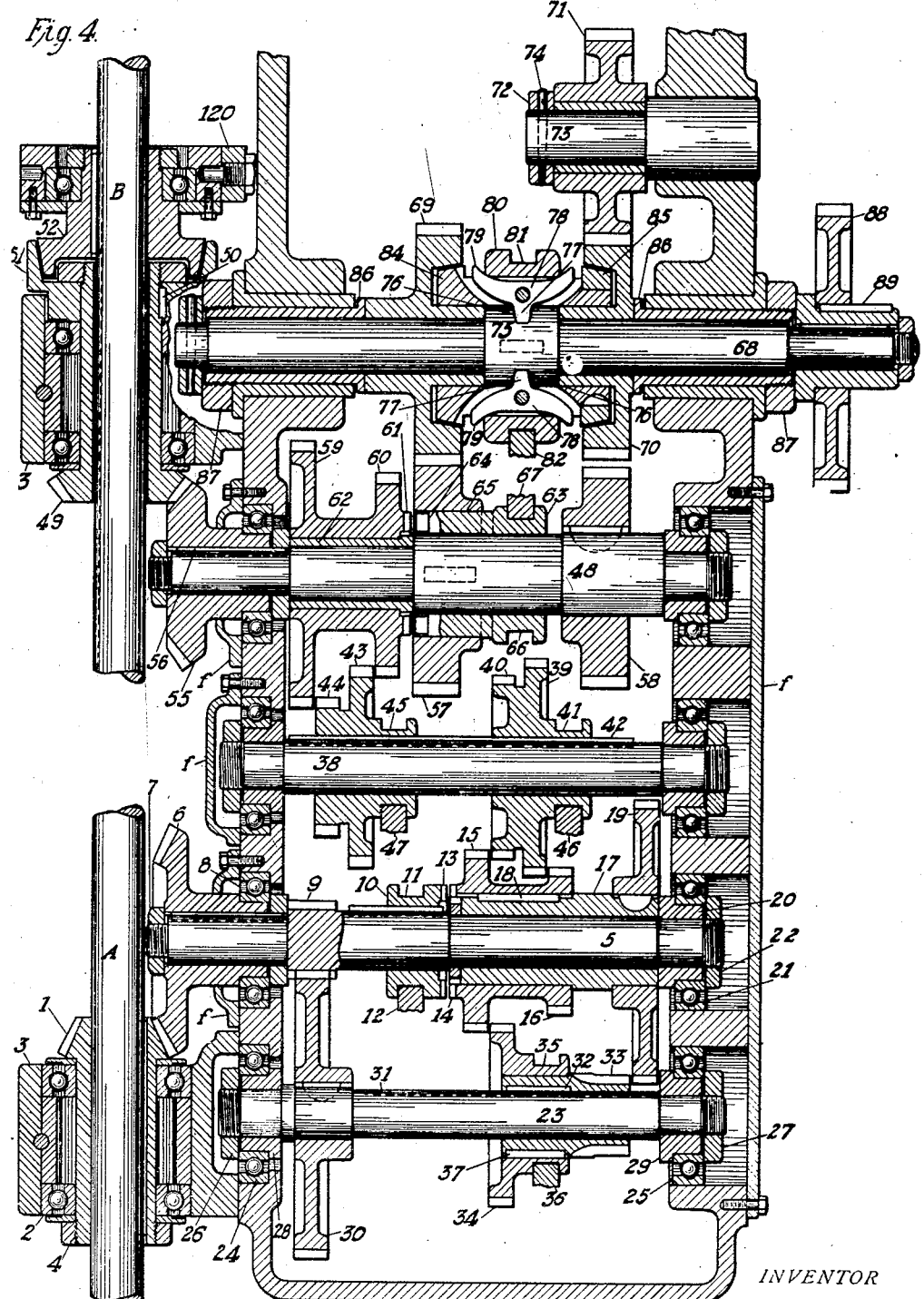

March 10, 1931.                E. A. MULLER                1,796,042
                             GEAR BOX MECHANISM
                             Filed Nov. 4, 1927            13 Sheets-Sheet 1
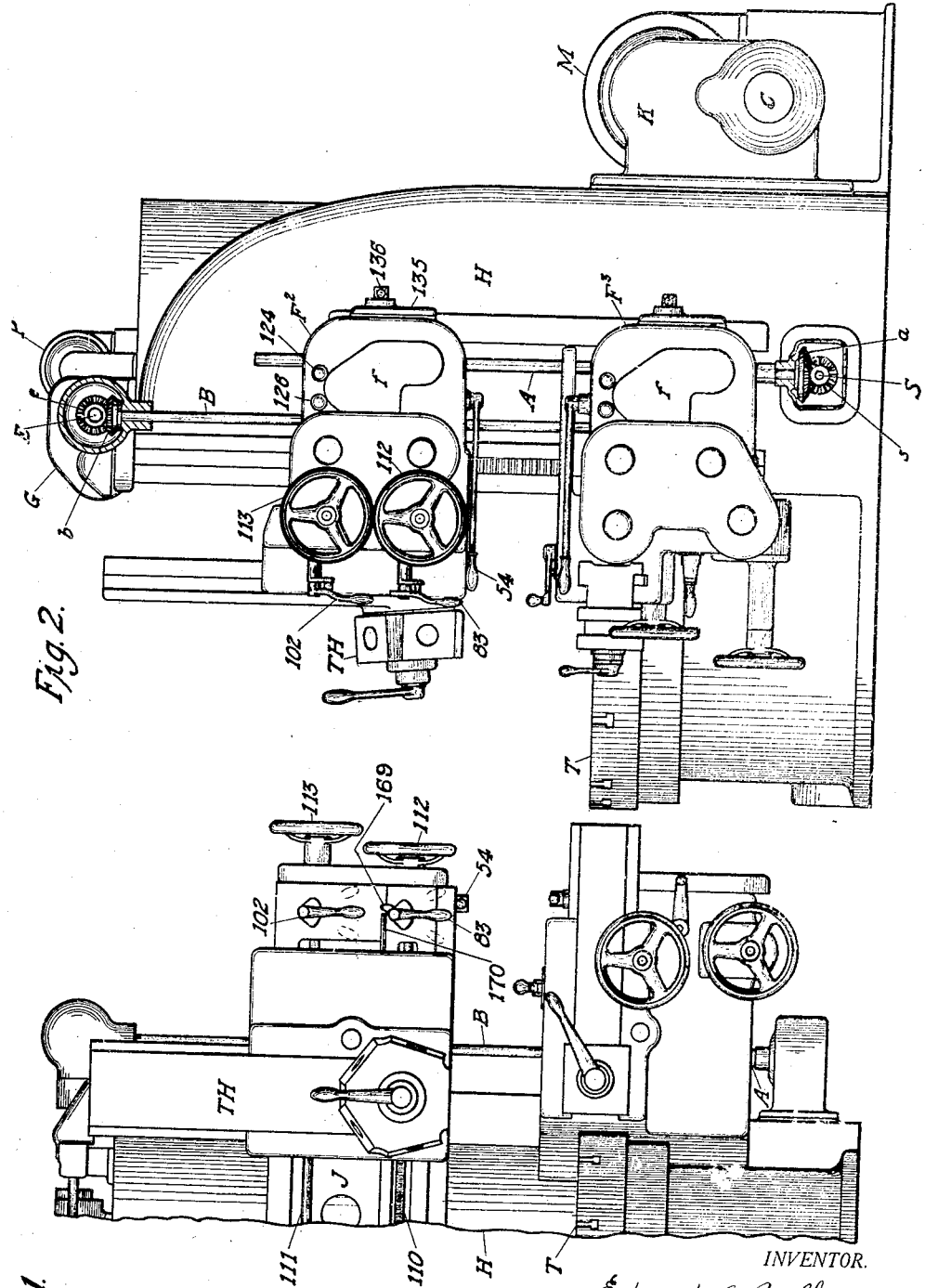
INVENTOR.
Edward A. Muller
BY
Walter A. Knight
ATTORNEY.

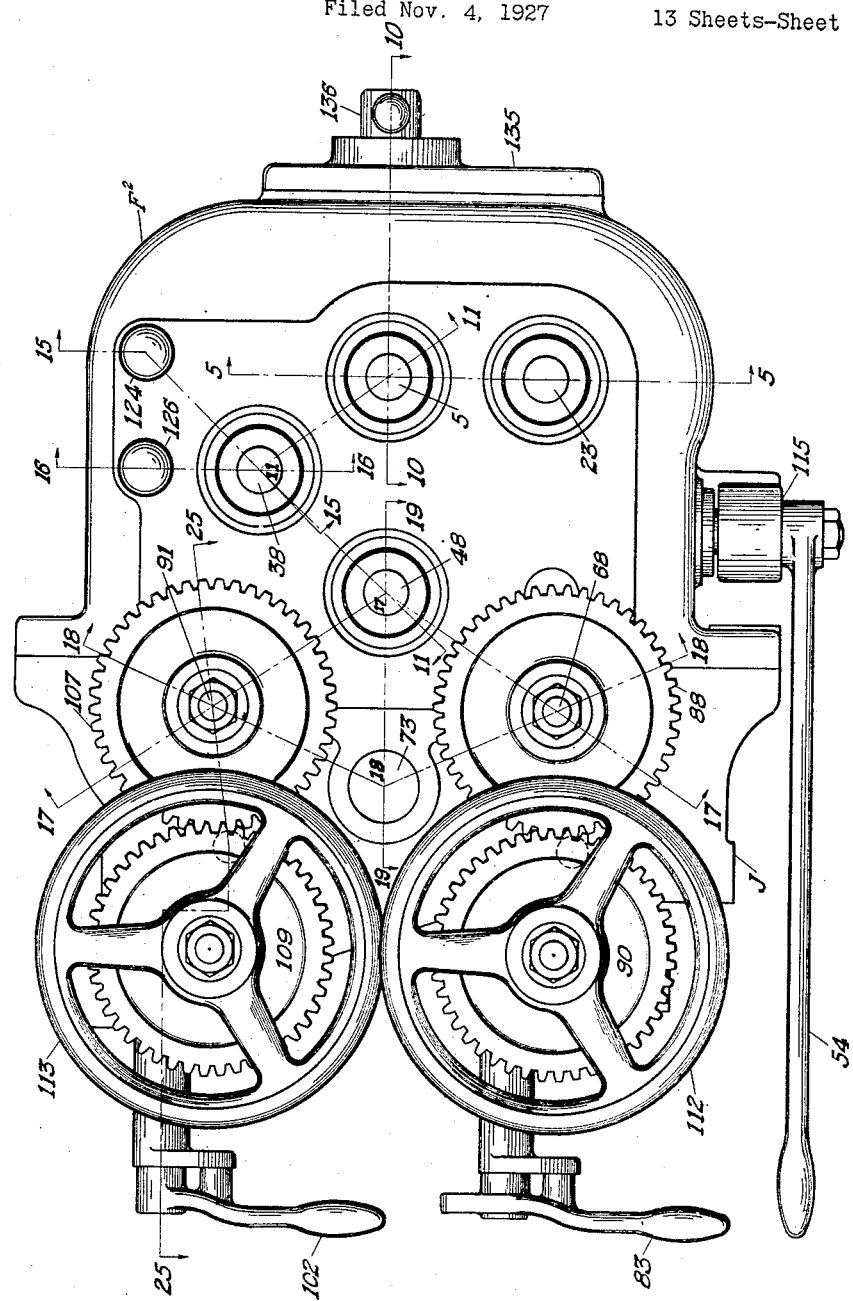

March 10, 1931. E. A. MULLER 1,796,042
GEAR BOX MECHANISM
Filed Nov. 4, 1927 13 Sheets-Sheet 3

INVENTOR
Edward A. Muller
BY
Walter A. Knight ATTORNEY

March 10, 1931.  E. A. MULLER  1,796,042
GEAR BOX MECHANISM
Filed Nov. 4, 1927   13 Sheets-Sheet 4

INVENTOR
Edward A. Muller
BY
Walter A. Knight.
ATTORNEY

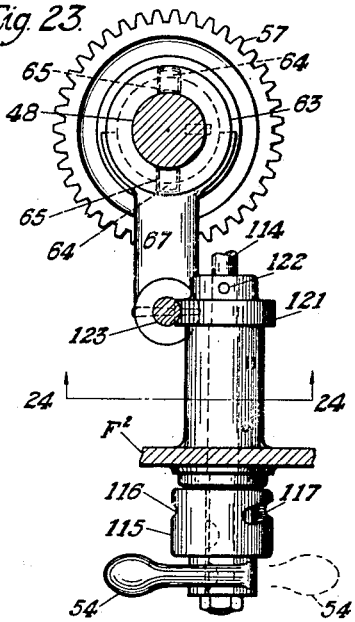
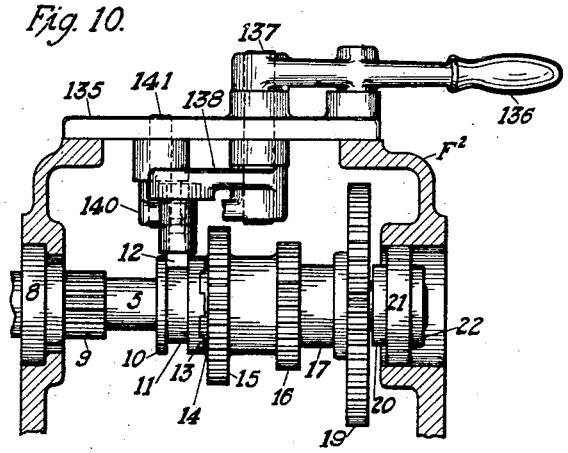
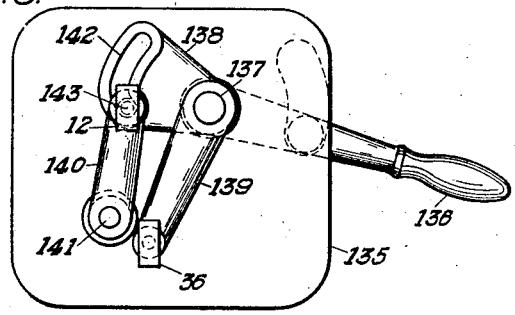
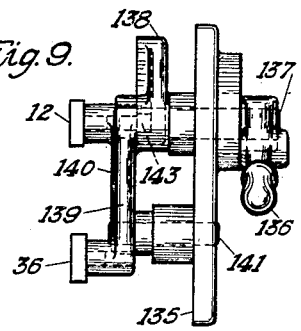
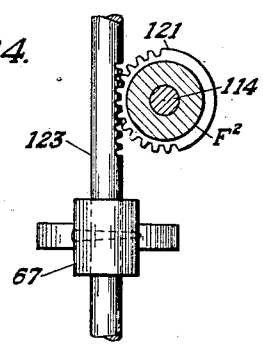
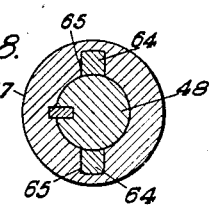

March 10, 1931.  E. A. MULLER  1,796,042
GEAR BOX MECHANISM
Filed Nov. 4, 1927      13 Sheets-Sheet 6

INVENTOR
Edward A. Muller
BY
Walter A. Knight
ATTORNEY

March 10, 1931.  E. A. MULLER  1,796,042
GEAR BOX MECHANISM
Filed Nov. 4, 1927   13 Sheets-Sheet 7

INVENTOR
Edward A. Muller
BY
Walter A. Knight ATTORNEY

March 10, 1931.  E. A. MULLER  1,796,042
GEAR BOX MECHANISM
Filed Nov. 4, 1927     13 Sheets-Sheet 8

INVENTOR.
Edward A. Muller
BY Walter A. Knight
ATTORNEY.

March 10, 1931.      E. A. MULLER      1,796,042
GEAR BOX MECHANISM
Filed Nov. 4, 1927      13 Sheets-Sheet 9
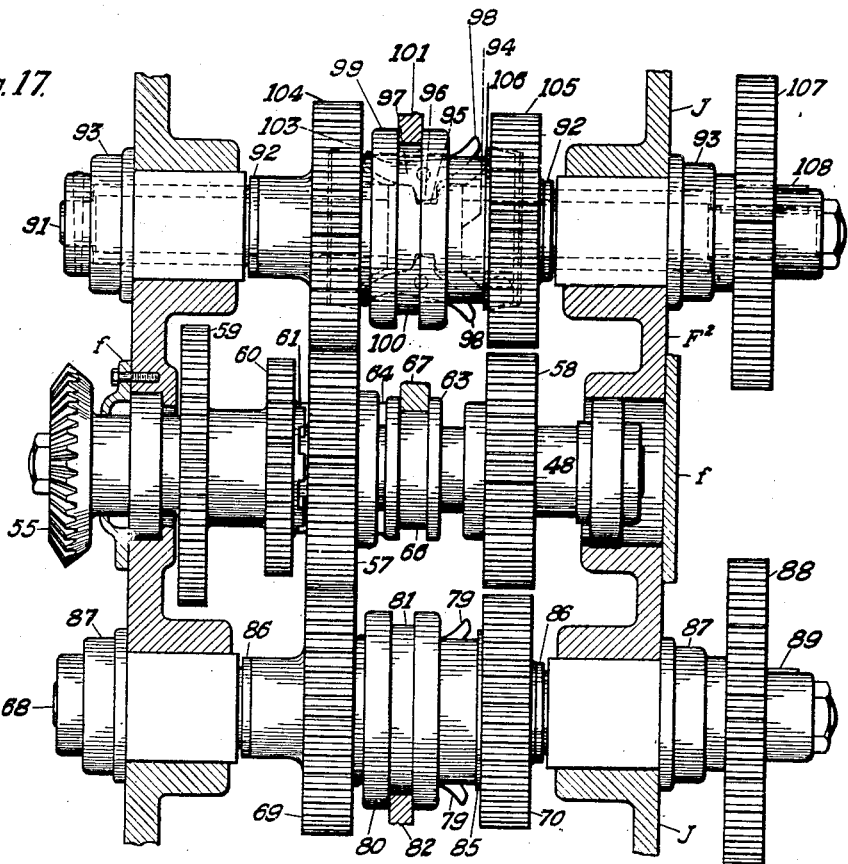
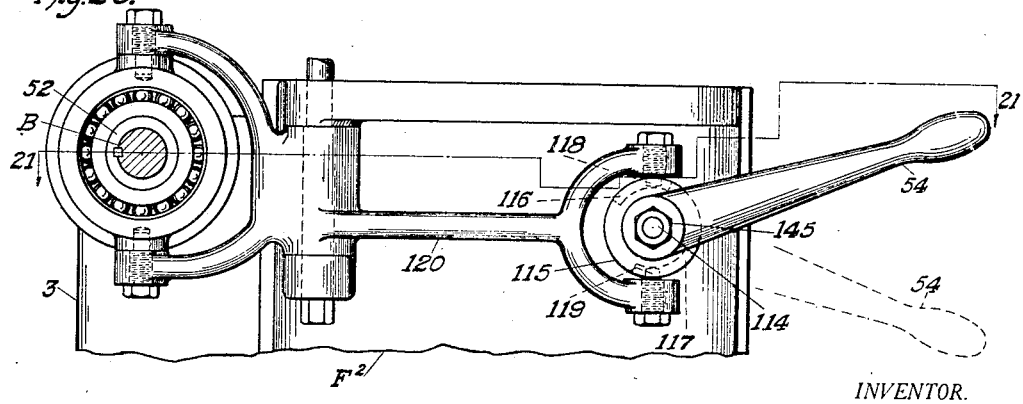
INVENTOR.
Edward A. Muller
BY Walter A. Knight
ATTORNEY.

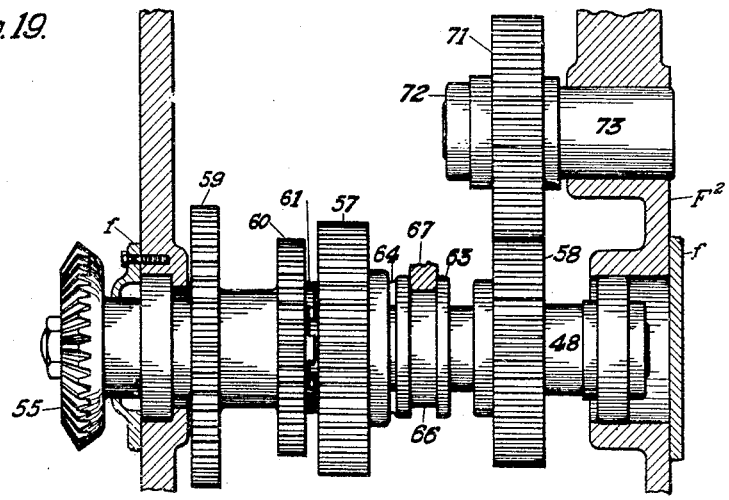
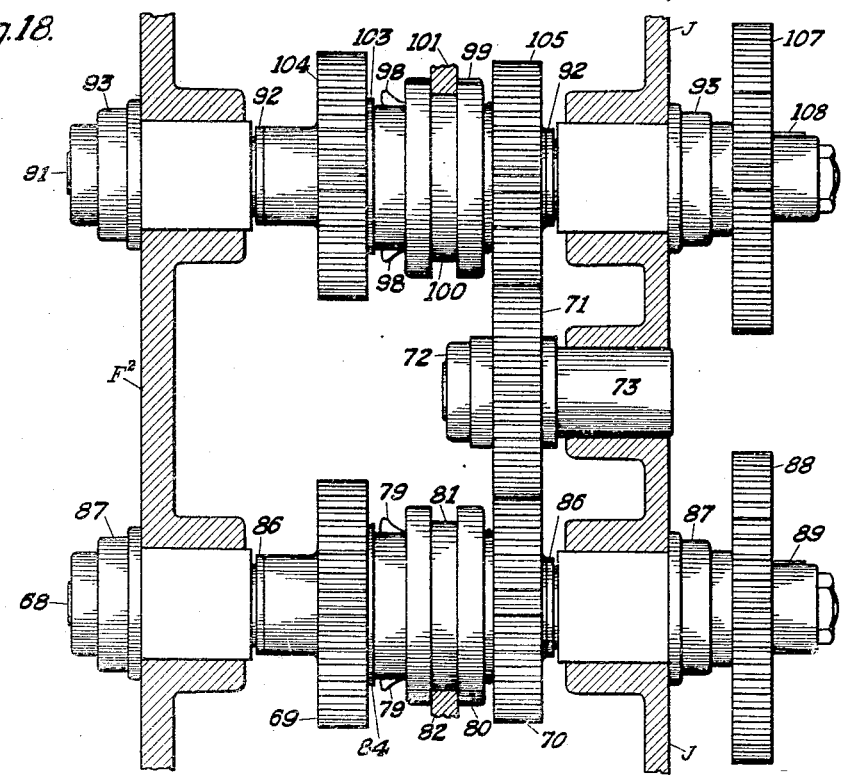

March 10, 1931.  E. A. MULLER  1,796,042
GEAR BOX MECHANISM
Filed Nov. 4, 1927    13 Sheets-Sheet 11
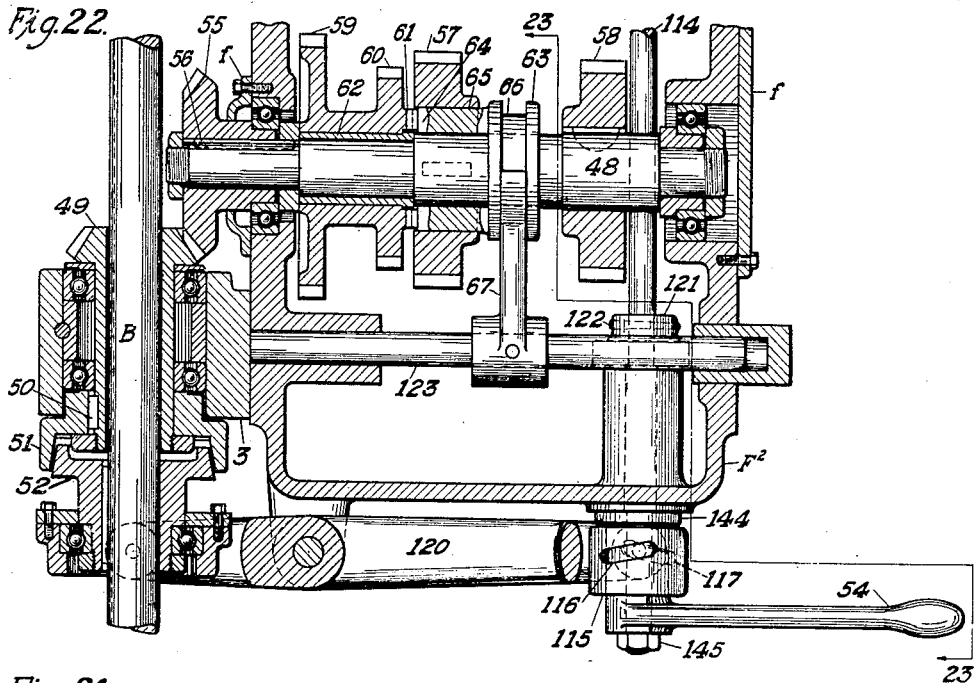
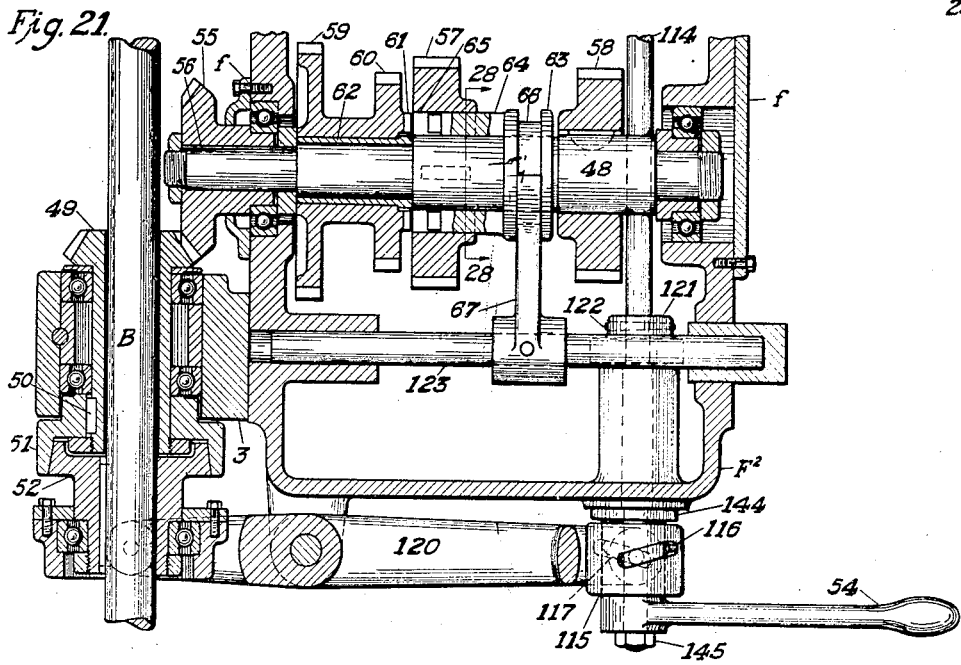
INVENTOR.
Edward A. Muller
BY
Walter A. Knight
ATTORNEY.

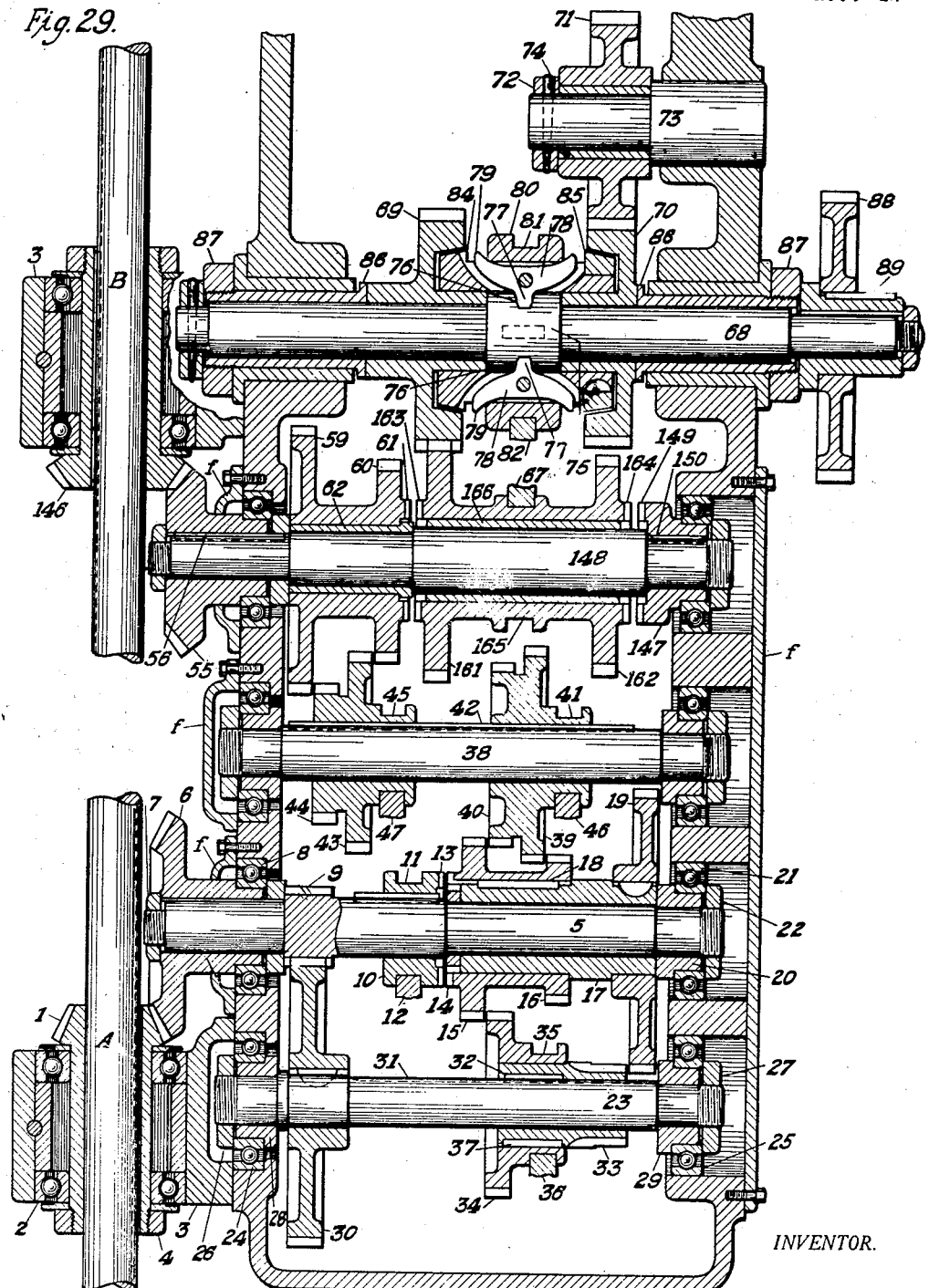

March 10, 1931.  E. A. MULLER  1,796,042
GEAR BOX MECHANISM
Filed Nov. 4, 1927   13 Sheets-Sheet 13
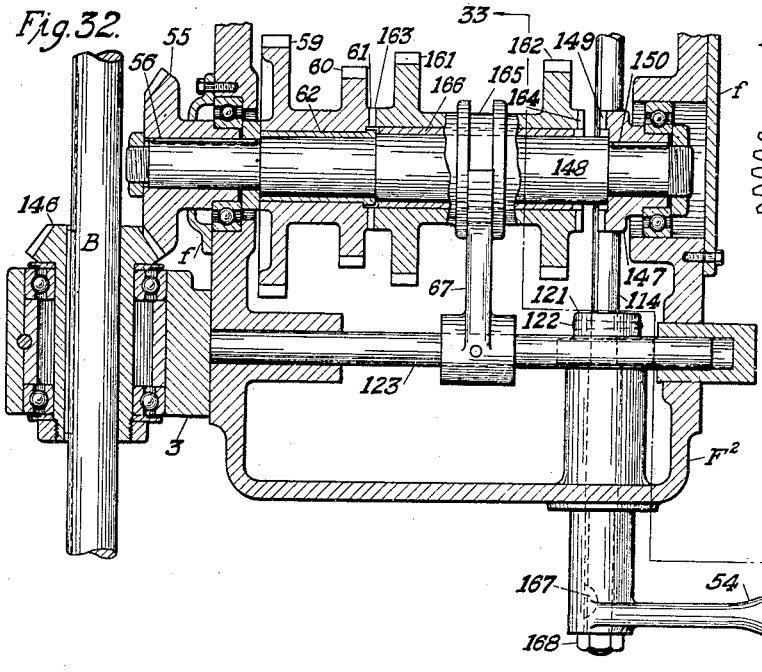
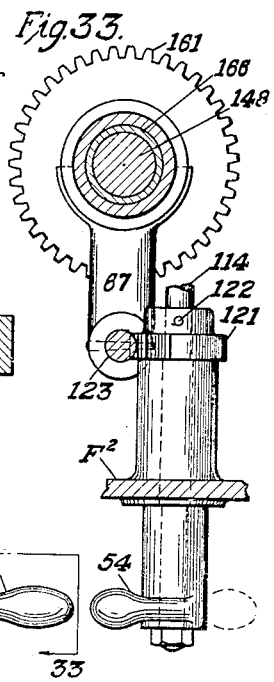
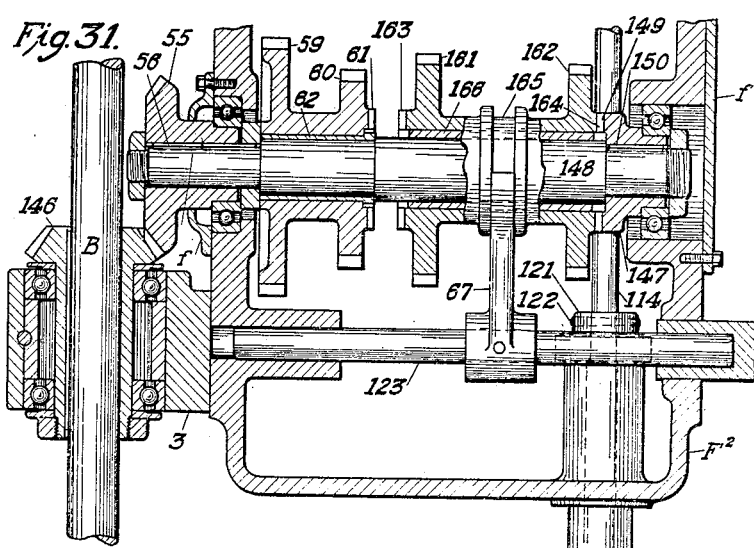
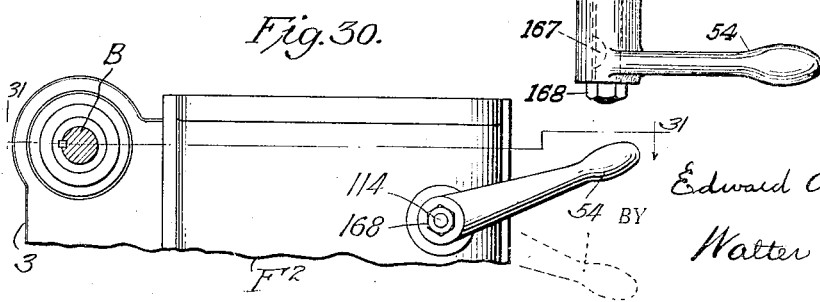
INVENTOR.
Edward A. Muller
BY Walter A. Knight
ATTORNEY.

Patented Mar. 10, 1931

1,796,042

UNITED STATES PATENT OFFICE

EDWARD A. MULLER, OF CINCINNATI, OHIO

GEAR-BOX MECHANISM

Application filed November 4, 1927. Serial No. 231,001.

My invention relates to machine tools and particularly to combined power driven feeding mechanism, and mechanism for quickly positioning the tool in approximate position for work, which is generally spoken of as rapid traverse mechanism.

The principal object of the invention is to simplify the construction by concentrating in one gear box rapid traverse and feed mechanism heretofore constructed in three or more separate gear boxes.

In machine tools having two or more heads, it will be understood that the operation of one head entirely independently of the other is of great importance; therefore, there will be one such gear box containing rapid traverse and feed mechanism for each cutting head and the mechanism for each box will be independently operated.

Such combined mechanism enables the operator to shift all levers for each cutting head from a single position, and this is another object of my invention. This greatly increases the normal output of work from the machine by saving the operator's time.

Another object of my invention is to utilize one and the same lever for controlling the power feed and the power rapid traverse. Each machine will require two such levers for each head one of which will control the in and out feed and the in and out rapid traverse, while the other will control the up and down feed and the up and down rapid traverse. In operating a machine of this kind, it is customary for the operator to keep his eyes on the cutting tools, and operate the controlling levers without looking at them. It is therefore obvious that by using the same lever for two purposes—thereby reducing the number of levers necessary to properly operate the machine; the ease of operation is greatly increased and, the operating time greatly reduced.

Another object of my invention is to make it impossible for a careless operator to cause the rapid traverse gear train and the feed gear train to be operatively engaged simultaneously.

The diminished number of parts for each such combined control mechanism, together with the fact that identical mechanism is used for a plurality of purposes, results in economy of manufacture, and this is another object of my invention.

With my improved mechanism it is possible to transmit power from the feed box directly to the side-head without having to pass thru lead screws or other shafts, and this is another object of my invention.

With my improved mechanism, it is also possible to use one shaft to transmit power feed and another to transmit power rapid traverse to the feed box on the rail and the feed box on the side-head, operating both heads in and out and up and down either independently or in unison in forward or reverse drive at pleasure. My improvement also permits both horizontal and vertical movement of the head simultaneously, and these are also objects of my invention.

Another object of my invention is to so arrange the operating levers that their movement in any direction produces a movement of the cutting tool in the same direction.

Another object of my invention is to provide a constant rate of power rapid traverse movement to the heads—so that they may be adjusted as quickly when the table is standing still or running at a slow speed, as when it is running at a fast speed.

Another object of my invention is to make the friction clutches on the friction clutch shaft adjustable from the outside of the gear box.

The particular embodiment of my invention selected for illustration in Figures 1 to 28 inclusive, is a combined rapid traverse and feed mechanism as applied to the right hand side of a turning and boring mill.

Figure 7:
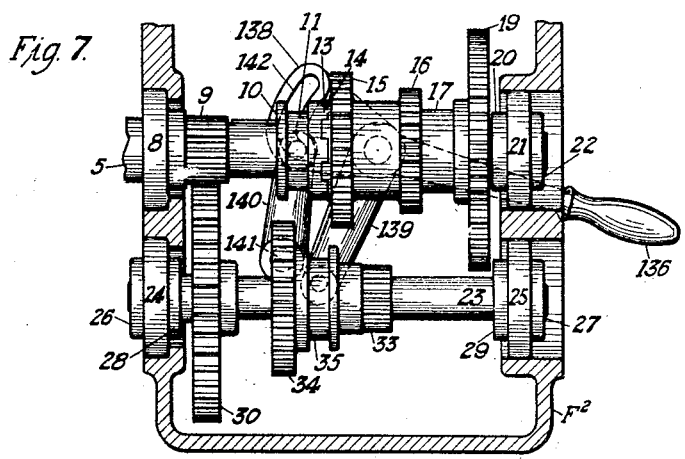
Figure 6:
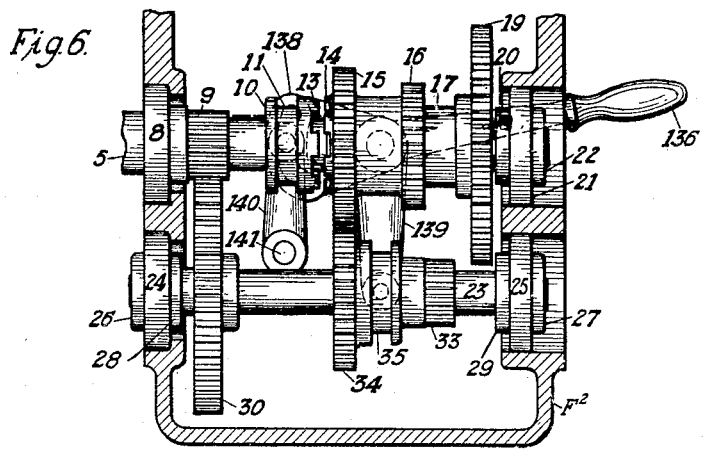
Figure 5:
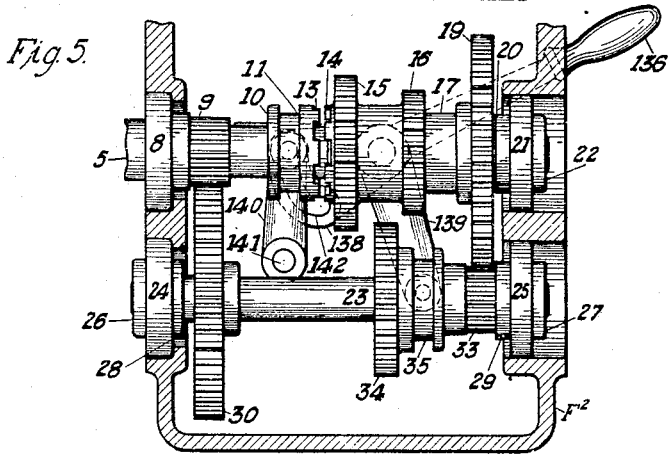
Figure 11:
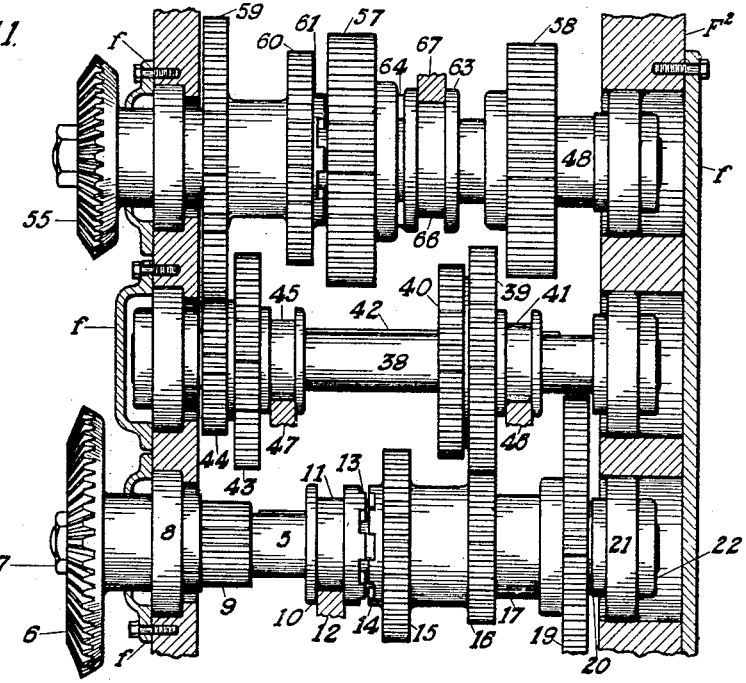
Figure 12:
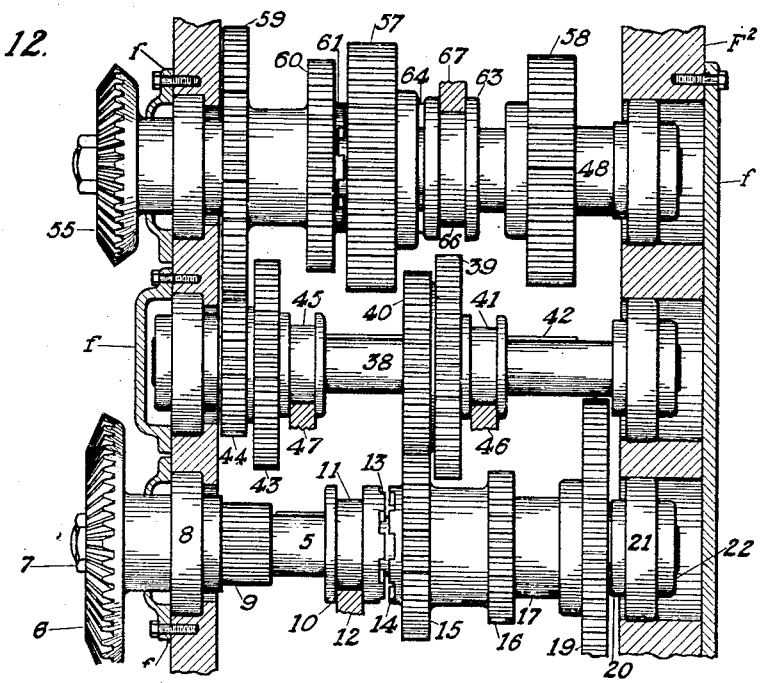
Figure 13:
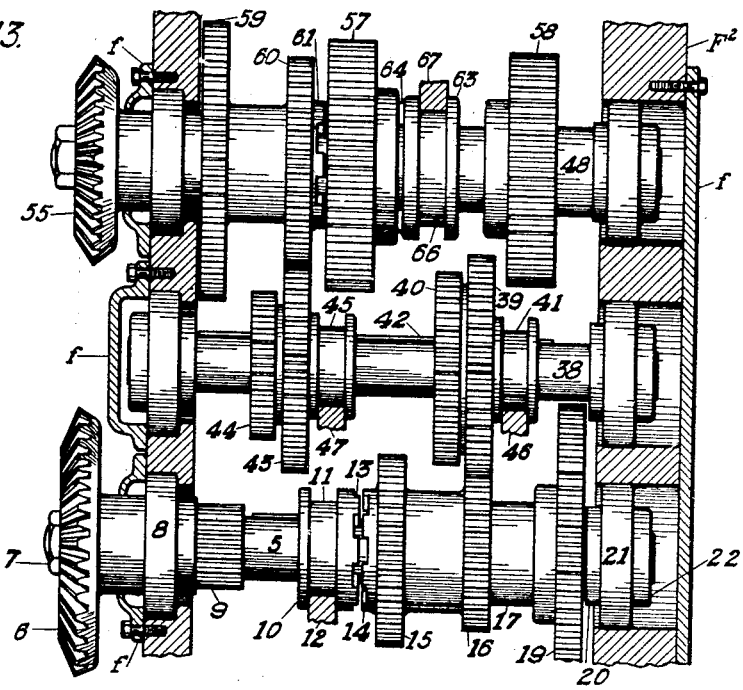
Figure 14:
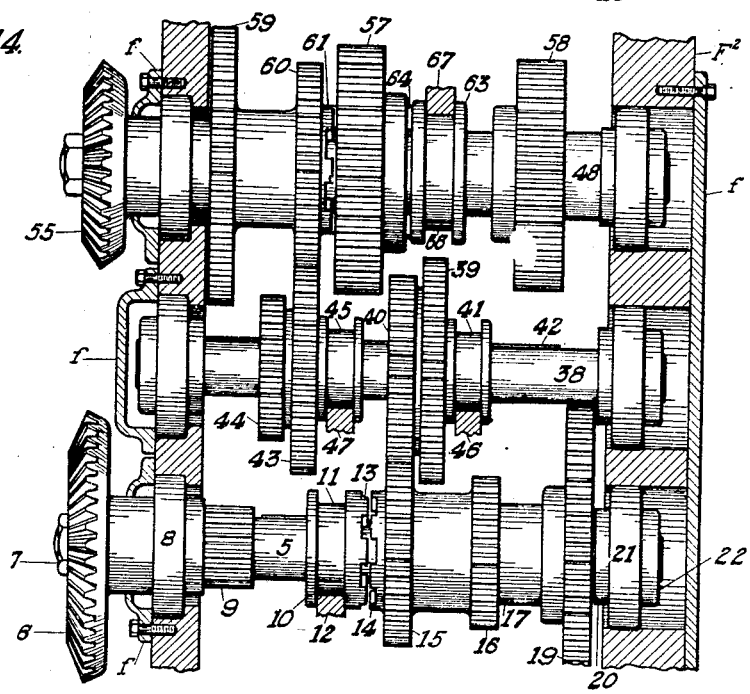
Figure 16:
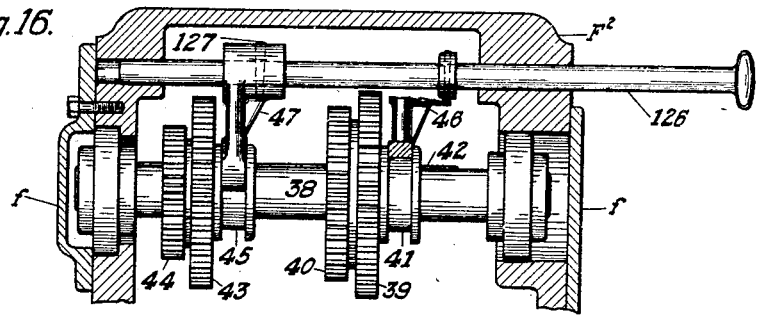
Figure 15:
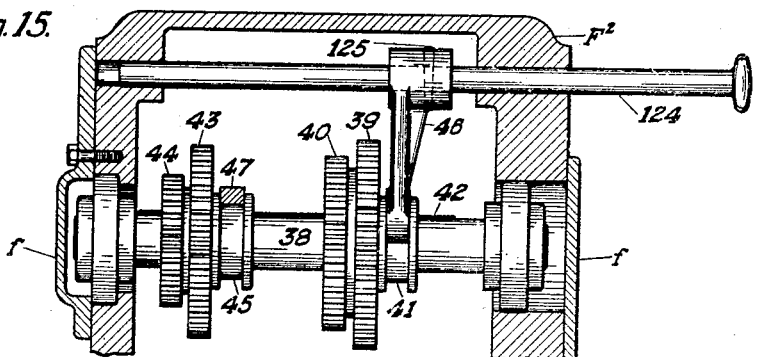

Figure 1, is a front elevation of the right side of a turning and boring mill, with a box containing the invention in position to control the turret head and another to control the side-head, Fig. 2, is a right side elevation of the same, with parts broken away and in section and another part left off to expose operating mechanism, Fig. 3, an enlarged view, is a right end elevation of my invention as applied to the right end of the cross-rail, with covers removed, Fig. 4, is a diagrammatic layout of the rapid traverse and feed mechanism shown in section, all gears and clutches being shown in neutral position, and parts broken away to show underlying mechanism, Fig. 5, a detail, is a section through the box on the line 5—5 of Fig. 3, with the feed back gears and their shifting mechanism in low speed position, shown in full lines, Fig. 6, is the same as Fig. 5, with said gears and their shifting mechanism in intermediate speed position, Fig. 7, is the same as Fig. 5, with said gears and their shifting mechanism in high speed position, Fig. 8, a detail, is an elevation of the feed back gear shifting mechanism, shown from the inside of the gear box, Fig. 9, a detail, is a view from the right side of the back gear shifting mechanism, removed from the box, Fig. 10, a detail, is a section on the line 10—10 of Fig. 3 of the box, with the back gear shifting mechanism in place and shown in full lines, Fig. 11, is a section on the line 11—11—11 of Fig. 3 showing the gears in first or low speed position, Fig. 12, is the same as Fig. 11, with the gears in the second speed position, Fig. 13, is the same as Fig. 11, with the gears in the third speed position, Fig. 14, is the same as Fig. 11, with the gears in the fourth or high speed position, Fig. 15, a detail, is a section through the box on the line 15—15 of Fig. 3, with the back shifter rod and the gears it controls, shown in full lines with said gears in neutral position, Fig. 16, a detail, is a section through the box on the line 16—16 of Fig. 3, with the front shifter rod and the gears it controls shown in full lines, with said gears in neutral position, Fig. 17, is a section through the box on the line 17—17—17 of Fig. 3, showing the reversing clutches for both vertical and horizontal feeds and vertical and horizontal power traverse in full lines and engaged in a forward position, Fig. 18, is a section through the box on the line 18—18—18 of Fig. 3, showing the reversing clutches for both vertical and horizontal feeds and vertical and horizontal power traverse, in full lines and engaged in a reverse position, Fig. 19, a detail, is a section through the box on the line 19—19 of Fig. 3, showing the power traverse driven shaft and the reverse pinion shown in full lines.

Figure 25:
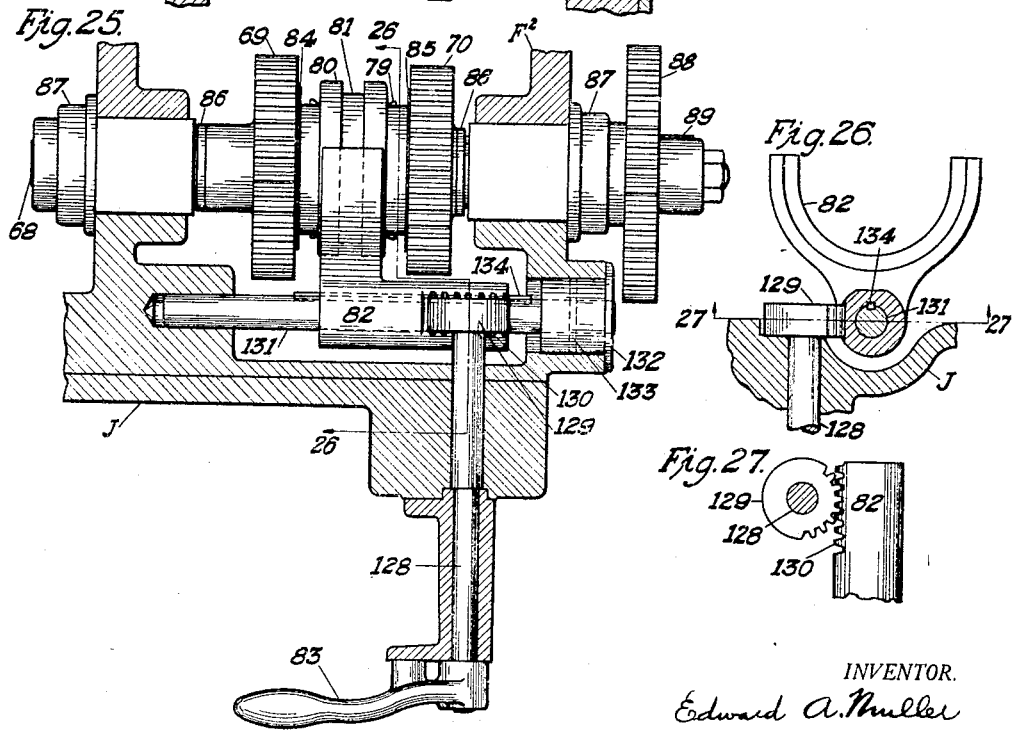
Figure 26:
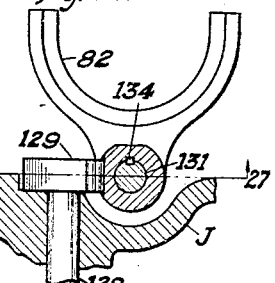
Figure 27:
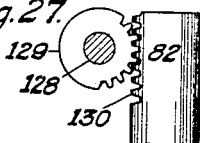

Fig. 20, a detail, is an under plan view of the front side of the box, showing the interlocking means between the feed and the power traverse shifter, with the traverse clutch disengaged and the feed clutch engaged, Fig. 21, a detail, is a section through the box and traverse clutch on the line 21—21 of Fig. 20, some parts shown in full lines, with the traverse clutch engaged and the feed clutch disengaged, Fig. 22, is the same as Fig. 21, with the traverse clutch disengaged and the feed clutch engaged, Fig. 23, a detail, is a section on the line 23—23 of Fig. 22, Fig. 24, a detail, is a section on the line 24—24 of Fig. 23, showing the shifting gear segment and its rack rod only, Fig. 25, a detail, is a section on the line 25—25 of Fig. 3, of the box and rail, with the reverse friction shifting mechanism in place and shown in full lines, Fig. 26, a detail is a section on the line 26—26 of Fig. 25, showing a fragment of the rail, with the reverse shifter yoke and pinion shown in full lines and the hand lever turned 90 degrees out of its true position, Fig. 27, a detail, is a section on the line 27—27 of Fig. 26, showing the shifter pinion and a fragment of the yoke only, Fig. 28, a detail, is a section through the forward driving gear and the power traverse shaft on the line 28—28 of Fig. 21.

An alternative embodiment of my invention selected for illustration in Figs. 29–33 inclusive, is a combined rapid traverse and feed mechanism as applied to the right hand side of a turning and boring mill.

Fig. 29, is a diagrammatic layout of the rapid traverse and feed mechanism shown in section, all gears and clutches being shown in neutral position and parts broken away to show underlying mechanism, Fig. 30, a detail, is an under plan view of the front side of the box showing in full lines the lever in the position it will occupy when the traverse clutch is disengaged and the feed clutch engaged, Fig. 31, a detail, is a section through the box and traverse clutch on the line 31—31 of Fig. 30, some parts shown in full lines, with the traverse clutch engaged and the feed clutch disengaged, Fig. 32, is the same as Fig. 31, with the traverse clutch disengaged and the feed clutch engaged, and Fig. 33, is a section on the line 33—33 of Fig. 32, secured to a fragment of the box.

Referring now to the drawings, Figures 1 to 28 inclusive, and particularly to Figs. 1 and 2, H is the housing, M is the main driving motor, T is the work table, P is the tool positioning motor, J is the rail, TH is the turret head on the right end of the rail, K is the driving gear box, C is the clutch housing, $F^2$ is the gear box or case for the turret head mechanism, and $F^3$ is the gear box or case for the side head.

The motor M through the gear box K and other suitable mechanism (not shown) in the base of the housing drives the feed take off shaft S, which through bevel gear $s$, drives the bevel gear $a$ on the feed driving shaft A.

The motor P through the gear box G drives the power traverse gear box shaft E, which through bevel gear $e$ drives the bevel gear $b$ on the power traverse driving shaft B.

The mechanism of the gear boxes $F^2$ and $F^3$ is alike. That of box $F^2$ has been selected for description. It has any desired number of covers $f$, for convenience in affording access to the interior in assembling the mechanism and for keeping the dirt out of the box and keeping the lubricating oil in.

Referring now more particularly to Fig. 4, splined to the feed driving shaft A is a bevel pinion 1, mounted in a suitable bearing 2, in a bracket 3, secured to the box $F^2$. A take-up nut 4 is provided for convenience of assembly.

The bevel pinion 1 is constantly in mesh with gear 6 and through it drives the shaft 5. A gear 6 is keyed to shaft 5 and held in place by retaining nut 7. The shaft 5 is mounted in a suitable bearing 8 on the hub of gear 6. Integral with the shaft 5 is a feed pinion 9. A sliding positive clutch member 10 splined to the shaft 5, has an annular groove 11 which receives the shifter lever shoe 12, and has clutch jaws 13 on its inner face.

Clutch jaws 14 are adapted to co-act with jaws 13. Jaws 14, intermediate gear 15, and small gear 16 are preferably made integral, and are fixed to the sleeve 17 by key 18.

Large gear 19 is also keyed to the sleeve 17. A hub 20, suitable bearing 21, and retaining nut 22, support the end of shaft 5.

A back gear shaft 23 has hubs 28 and 29 and is supported in the box $F^2$ by suitable bearings 24 and 25 and is held in position by retaining nuts 26 and 27. The large back gear 30 is keyed to the shaft 23 and is constantly in mesh with pinion 9.

A key-way 31 in the shaft 23 receives a key 32 fixed to the elongated hub of the small slidable back gear 33. An intermediate back gear 34 has its hub elongated to form an annular groove 35 which receives the shifter link shoe 36, and is fixed on to gear 33 by key 37. Gears 33 and 34 are adapted to mesh with gears 19 and 15 respectively on shaft 5.

Referring now particularly to Figs. 8, 9 and 10, a cover plate 135 is fixed to the box $F^2$. The lever 136 is pinned to the outer end of the shaft 137 which turns in a suitable bearing in plate 135. Pinned to the inner end of shaft 137 is a combination cam 138 and lever 139. Link 140 pivoted on the pin 141 in the plate 135 carries a shifter shoe 12 which is adapted to engage a groove 11 in the clutch 10. (See Fig. 4.) Lever 139 carries the shifter shoe 36 which is adapted to engage the groove 35 (Fig. 4) on the gear unit 33—34. The link 140 carries at its upper end cam follower pin 143 which is operated by the slot 142 of the cam 138. Lever 136 is shown in its lowest position in Fig. 8, which places the gears 9, 15, 16, 19, 33 and 34 and the clutch member 10 in the positions shown in Fig. 7. When shifted upwardly to its intermediate position, lever 136 places the gears and clutch just mentioned in the positions shown in Fig. 6. When shifted to its highest position lever 136 places the gears and clutch in the positions shown in Fig. 5.

Referring now particularly to Fig. 4, the feed sliding gear shaft 38 is supported in the box $F^2$, in the same manner as shaft 23. Gears 39 and 40 and the hub that carries the annular groove 41 are made unitary and slidable on the shaft 38 with its spline 42. Gears 39 and 40 are adapted to mesh with gears 16 and 15 respectively on the shaft 5.

The groove 41 receives the shifter yoke 46. Gears 43 and 44 and the hub that carries the annular groove 45 are made unitary and slidable on shaft 38 and spline 42. The groove 45 receives the shifter yoke 47.

Referring particularly to Fig. 15, the shifter yoke 46 is fixed to the shifter rod 124 by pin 125. The rod 124 and its yoke 46 are shown in neutral position and when shifted to the left, gear 40 is thrown into mesh with gear 15, as shown in Fig. 12. When thrown to the right, gear 39 is thrown into mesh with gear 16 as shown in Fig. 11.

Referring particularly to Fig. 16, the yoke 47 is fixed to the shifter rod 126 by means of pin 127, the mechanism being shown in neutral position in this figure. When the rod and its yoke are shifted to the left from the position shown in Fig. 16, the gear 44 is thrown into mesh with the gear 59 as shown in Figs. 11 and 12; when shifted to the right, the gear 43 is thrown into mesh with gear 60 as shown in Figs. 13 and 14.

Referring again particularly to Fig. 4, shafts 5 and 23 carry the compounding gears and shaft 38, feed increment gears and these three shafts and their mechanisms are concerned entirely with the transmission of power for the feed. Gears 59 and 60 on shaft 48 (all as hereinafter described) are also increment gears concerned entirely with feed. These are the only elements of the feed gears that function exclusively in connection with the feed.

Referring again particularly to Fig. 4, the shaft 48 through which power traverse is brought into the box, is supported in the box $F^2$ in the same manner as shaft 5.

Loose on the power traverse driving shaft B is a bevel pinion 49 mounted in the bracket 3 in the same manner as pinion 1.

Fixed to the elongated hub of the pinion 49 by key 50 is the cup member 51 of a friction clutch. The cone member 52 of the friction clutch is splined to the shaft B, and may be shifted by means of the lever 54 and its connected mechanism (see particularly Figs. 2, 3, 20 and 21).

The pinion 49 is constantly in mesh with the bevel gear 55 which is fixed to the shaft 48 by the key 56.

Forward driving gear 57 and reverse driving gear 58 are both keyed to the shaft 48. Large gear 59, small gear 60 and clutch jaw 61 are made unitary, are fitted with bushing 62 and this assembly is normally loose on the shaft 48. Gears 43 and 44 are adapted to mesh with gears 60 and 59 respectively on shaft 48.

The slidable member 63 of the clutch has fingers 64 which extend through slots 65 in the gear 57 and their outer ends engage the jaws 61 of the gear unit just described. An annular groove 66 in the clutch member 63 receives the yoke 67 operated by lever 54 and its connecting mechanism.

Gear 57 is constantly in mesh with forward clutch gear 69 normally loose on horizontal feed friction clutch shaft 68.

Referring particularly to Figs. 20, 21, 22, 23, 24, and 28, lever 54 is fixed to a combined feed and power traverse shifter rocker shaft 114 to which is fixed a cylindrical box cam 115 with cam slots 116, 117. Cam follower pin 118 is adapted to co-act with slot 116 and similar pin 119 is adapted to co-act with the slot 117. The cylindrical box cam 115 may be adjusted axially of its shaft 114 by screwing the sleeve 144 inwardly and tightening the nut 145 to loosen the cone 52, while reverse adjustment would tighten the clutch.

Lever 54 is shown in neutral position in Fig. 1 and by shifting it to the right to the position shown in Fig. 1 in dotted lines to the right and in Fig. 20 in dotted lines, the box cam 115 and its co-acting pins 118—119 shift the yoke lever 120 so as to throw the cone member 52 into engaging contact with the cup member 51 of the power traverse friction clutch, causing shaft B through pinion 49 and gear 55 to rotate shaft 48. At the same time the rotation of the shaft 114 to which gear segment 121 is fixed by means of the pin 122 moves shifter rod 123 to the right to the position shown in Fig. 21, causing the yoke 67 to shift the clutch fingers 64 out of contact with the clutch jaw 61, all as shown in Fig. 21.

By referring to Fig. 22 it will be seen that shifting the lever 54 to the left to the position shown in Fig. 1, in dotted lines to the left, and in Fig. 20 in full lines, the power traverse friction clutch will be disengaged so that the shaft 48 will no longer be rotated through pinion 49 and gear 55 and the clutch fingers 64 will engage the clutch jaws 61, causing the gear shaft 48 to be rotated through the gear assembly 59, 60 and 62.

Referring again particularly to Fig. 4, gear 58 is constantly in mesh with reverse gear 71 held by collar 72 and pin 74, on stud 73 fixed in the box F². Gear 71 is constantly in mesh with reverse clutch gear 70 which is normally loose on the shaft 68.

Shaft 68 has thrust bearings 86, 86 adjustable by means of collars 87, 87 outside the gear box and this shaft is suitably mounted in the box F² and has an enlarged portion 75 slotted at 76, 76 to receive the fulcrums 77, 77 of rocking clutch members 78, 78 having fingers 79, 79. A shifter spool 80 with annular groove 81 is adapted to be shifted by yoke 82 through lever 83 (see Figs. 1 and 24) to engage forward driving clutch cone 84, causing it to be rotated by gear 69 when shifted to the left (see Fig. 4) or to engage reverse driving clutch cone 85 mounted on the extended hub of cone 84 causing cone 85 to be rotated by gear 70 when shifted to the right.

Gear 88 fixed to shaft 68 by key 89 drives horizontal feed gear 90 (see Fig. 3).

Referring now particularly to Fig. 25, when the lever 83 is shifted to the left of the position shown in Fig. 1, the lever rod 128 carrying gear segment 129 engaging with the rack teeth 130 on the yoke 82 moves the yoke 82 slidably mounted on the shaft 131 and spline 134 to the left causing the clutch cone 84 to engage with the friction cup in the gear 69 and be driven by it. When the lever 83 is shifted to the right of the position shown in Fig. 1, the yoke 82 moves to the right causing the cone 85 to engage with the friction cup in the gear 70 and be driven by it. The shaft 131 is fixed at one end in a bushing 132 by pin 133 preventing rotation.

Referring now particularly to Fig. 17, vertical feed friction clutch shaft 91 and its equipment are duplicates in all respects of horizontal feed friction clutch shaft 68 and its equipment.

Since the shifting mechanism provided to shift all parts on the shaft 91 is identical with that of Fig. 25 and since, as stated previously, all parts on the shaft 91 are identical to those on shaft 68, duplication of such shifting mechanism has been omitted.

Gear 57 is constantly in mesh with forward clutch gear 104 normally loose on vertical feed friction clutch shaft 91.

Gear 71 (see Fig. 18) is constantly in mesh with reverse clutch gear 105 which is normally loose on the shaft 91.

Shaft 91 has thrust bearings 92 adjustable by means of collars 93—93 outside the gear box and this shaft is suitably mounted in the box F² and has an enlarged portion 94 slotted at 95—95 to receive the fulcrums 96—96 of rocking clutch members 97—97 having fingers 98—98. A shifter spool 99 with annular groove 100 is adapted to be shifted by yoke 101 through lever 102 (see Figs. 1 and 3) to engage forward driving clutch cone 103, causing it to be rotated by gear 104 when shifted to the left (see Fig. 4) or to engage reverse driving clutch cone 106 mounted on the extended hub of cone 103, causing cone 106 to be rotated by gear 105 when shifted to the right.

Gear 107 fixed to shaft 91 by key 108 drives vertical feed gear 109 (see Fig. 3).

Horizontal feed gear 90 is fixed to and drives horizontal feed screw 110 (see Fig. 1) which is adapted to be manually adjusted by hand wheel 112. Vertical feed gear 109 is fixed to and drives vertical feed shaft 111, which is adapted to be manually adjusted by hand-wheel 113.

Whenever the extreme movement of the head TH to the right has been reached, lug 169 on lever 83 contacts with stop rod 170 and shifts clutch cone 85 out of engagement with the cup of gear 70, causing the head TH to cease its travel to the right.

The entire equipment within the box F² of shafts 68 and 91 and stud 73 and all the equipment of shaft 48 excepting gears 59 and 60 are concerned with the transmission of power for both feed and rapid traverse.

Bevel gear 55 is used only in transmitting power for rapid traverse.

The feed driving shaft A is rotated in a constant relation to the speed of the table T, by the usual or any convenient mechanism, and therefore, needs no description. The increment gears provide four different rates of feed, each of which may be compounded with any one of the three back gears. The mechanism in the box F² heretofore described in detail, therefore insures the feed of the tool at any one of twelve forward rates and at any one of twelve reverse rates either vertically or horizontally. These forty-eight feeds, four feeds at each rate, are provided as shown in the drawings. These will now be each separately indicated by referring to the drawings, the rates of feed being numbered 1 to 12, beginning with the lowest, feeds to the left being designated as L, feeds to the right being designated as R, upward feeds being indicated by U and downward feeds being indicated by D. In all the forty-eight feeds hereinafter to be described, lever 54 will be in the position shown in Fig. 22, in which the drive is from the shafts A and 38 and not from the shaft B. It will be obvious that power cannot be brought into the box from both these sources simultaneously, that is the power utilized at any time is from shaft A or shaft B; not from both, and that the rapid traverse cannot be used while the feed is in use.

1ᴸ is secured in the following manner:

Lever 136 will be in the position shown in Fig. 5. Shifter rod 124 will be pulled outwardly, that is to the right, from the position shown in Fig. 15, and shifter rod 126 will be pushed inwardly, that is to the left, from the position shown in Fig. 16. Lever 83 will be shifted to the left from the position shown in Fig. 1 in full lines, to the position indicated by dotted lines. With the levers in these positions, the gears and clutches will be in the positions shown in Figs. 5, 11 and 17 respectively.

1ᴿ is secured in the following manner:

Lever 136 will be in the position shown in Fig. 5. Shifter rod 124 will be pulled outwardly, that is to the right, from the position shown in Fig. 15, and shifter rod 126 will be pushed inwardly, that is to the left, from the position shown in Fig. 16. Lever 83 will be shifted to the right from the position shown in Fig. 1, in full lines, to the position indicated by dotted lines. With the levers in these positions, the gears and clutches will be in the positions shown in Figs. 5, 11 and 18 respectively.

1ᴰ is secured in the following manner:

Lever 136 will be in the position shown in Fig. 5. Shifter rod 124 will be pulled outwardly, that is to the right, from the position shown in Fig. 15, and shifter rod 126 will be pushed inwardly, that is to the left, from the position shown in Fig. 16. Lever 102 will be shifted to the left from the position shown in Fig. 1 in full lines, to the position indicated by dotted lines. With the levers in these positions, the gears and clutches will be in the positions shown in Figs. 5, 11 and 17 respectively.

1ᵁ is secured in the following manner:

Lever 136 will be in the position shown in Fig. 5. Shifter rod 124 will be pulled outwardly, that is to the right, from the position shown in Fig. 15, and shifter rod 126 will be pushed inwardly, that is to the left, from the position shown in Fig. 16. Lever 102 will be shifted to the right from the position shown in Fig. 1 in full lines to the position indicated by dotted lines. With the levers in these positions, the gears and clutches will be in the positions shown in Figs. 5, 11 and 18 respectively.

2ᴸ is secured in the following manner:

Lever 136 will be in the position shown in Fig. 5. Shifter rod 124 will be pushed inwardly, that is to the left, from the position shown in Fig. 15, and shifter rod 126 will be pushed inwardly, that is to the left, from the position shown in Fig. 16. Lever 83 will be shifted to the left from the position shown in Fig. 1 in full lines, to the position indicated by dotted lines. With the levers in these positions, the gears and clutches will be in the positions shown in Figs. 5, 12 and 17 respectively.

2ᴿ is secured in the following manner:

Lever 136 will be in the position shown in Fig. 5. Shifter rod 124 will be pushed inwardly, that is to the left, from the position shown in Fig. 15, and shifter rod 126 will be pushed inwardly, that is to the left, from the position shown in Fig. 16. Lever 83 will be shifted to the right from the position shown in Fig. 1 in full lines, to the position indicated by dotted lines. With the levers in these positions, the gears and clutches will be in the positions shown in Figs. 5, 12 and 18 respectively.

$2^D$ is secured in the following manner:

Lever 136 will be in the position shown in Fig. 5. Shifter rod 124 will be pushed inwardly, that is to the left, from the position shown in Fig. 15, and shifter rod 126 will be pushed inwardly, that is to the left, from the position shown in Fig. 16. Lever 102 will be shifted to the left from the position shown in Fig. 1 in full lines, to the position indicated by dotted lines. With the levers in these positions, the gears and clutches will be in the positions shown in Figs. 5, 12 and 17 respectively.

$2^U$ is secured in the following manner:

Lever 136 will be in the position shown in Fig. 5. Shifter rod 124 will be pushed inwardly, that is to the left, from the position shown in Fig. 15, and shifter rod 126 will be pushed inwardly, that is to the left, from the position shown in Fig. 16. Lever 102 will be shifted to the right from the position shown in Fig. 1 in full lines, to the position indicated by dotted lines. With the levers in these positions, the gears and clutches will be in the positions shown in Figs. 5, 12 and 18 respectively.

$3^L$ is secured in the following manner:

Lever 136 will be in the position shown in Fig. 5. Shifter rod 124 will be pulled outwardly, that is to the right, from the position shown in Fig. 15, and shifter rod 126 will be pulled outwardly, that is to the right, from the position shown in Fig. 16. Lever 83 will be shifted to the left from the position shown in Fig. 1 in full lines, to the position indicated by dotted lines. With the levers in these positions, the gears and clutches will be in the positions shown in Figs. 5, 13 and 17 respectively.

$3^R$ is secured in the following manner:

Lever 136 will be in the position shown in Fig. 5. Shifter rod 124 will be pulled outwardly, that is to the right, from the position shown in Fig. 15, and shifter rod 126 will be pulled outwardly, that is to the right, from the position shown in Fig. 16. Lever 83 will be shifted to the right from the position shown in Fig. 1 in full lines, to the position indicated by dotted lines. With the levers in these positions, the gears and clutches will be in the positions shown in Figs. 5, 13 and 18 respectively.

$3^D$ is secured in the following manner:

Lever 136 will be in the position shown in Fig. 5. Shifter rod 124 will be pulled outwardly, that is to the right, from the position shown in Fig. 15, and shifter rod 126 will be pulled outwardly, that is to the right, from the position shown in Fig. 16. Lever 102 will be shifted to the left from the position shown in Fig. 1 in full lines, to the position indicated by dotted lines. With the levers in these positions, the gears and clutches will be in the positions shown in Figs. 5, 13 and 17 respectively.

$3^U$ is secured in the following manner:

Lever 136 will be in the position shown in Fig. 5. Shifter rod 124 will be pulled outwardly, that is to the right, from the position shown in Fig. 15, and shifter rod 126 will be pulled outwardly, that is to the right, from the position shown in Fig. 16. Lever 102 will be shifted to the right from the position shown in Fig. 1 in full lines, to the position indicated by dotted lines. With the levers in these positions, the gears and clutches will be in the positions shown in Figs. 5, 13 and 18 respectively.

$4^L$ is secured in the following manner:

Lever 136 will be in the position shown in Fig. 5. Shifter rod 124 will be pushed inwardly, that is to the left, from the position shown in Fig. 15, and shifter rod 126 will be pulled outwardly, that is to the right, from the position shown in Fig. 16. Lever 83 will be shifted to the left from the position shown in Fig. 1 in full lines, to the position indicated by dotted lines. With the levers in these positons, the gears and clutches will be in the positions shown in Figs. 5, 14 and 17 respectively.

$4^R$ is secured in the following manner:

Lever 136 will be in the position shown in Fig. 5. Shifter rod 124 will be pushed inwardly, that is to the left, from the position shown in Fig. 15, and shifter rod 126 will be pulled outwardly, that is to the right, from the position shown in Fig. 16. Lever 83 will be shifted to the right from the position shown in Fig. 1 in full lines, to the position indicated by dotted lines. With the levers in these positions, the gears and clutches will be in the positions shown in Figs. 5, 14 and 18 respectively.

$4^D$ is secured in the following manner:

Lever 136 will be in the position shown in Fig. 5. Shifter rod 124 will be pushed inwardly, that is to the left from the position shown in Fig. 15, and shifter rod 126 will be pulled outwardly, that is to the right, from the position shown in Fig. 16. Lever 102 will be shifted to the left from the position shown in Fig. 1 in full lines, to the position indicated by dotted lines. With the levers in these positions, the gears and clutches will be in the positions shown in Figs. 5, 14 and 17 respectively.

$4^U$ is secured in the following manner:

Lever 136 will be in the position shown in Fig. 5. Shifter rod 124 will be pushed inwardly, that is to the left from the position shown in Fig. 15, and shifter rod 126 will be pulled outwardly, that is, to the right, from the position shown in Fig. 16. Lever 102 will be shifted to the right from the position shown in Fig. 1 in full lines, to the position indicated by dotted lines. With the levers in these positions, the gears and clutches will be in the positions shown in Figs. 5, 14 and 18 respectively.

5$^L$ is secured in the following manner:

Lever 136 will be in the position shown in Fig. 6. Shifter rod 124 will be pulled outwardly, that is to the right, from the position shown in Fig. 15, and shifter rod 126 will be pushed inwardly, that is to the left, from the position shown in Fig. 16. Lever 83 will be shifted to the left from the position shown in Fig. 1 in full lines, to the position indicated by dotted lines. With the levers in these positions, the gears and clutches will be in the positions shown in Figs. 6, 11 and 17 respectively.

5$^R$ is secured in the following manner:

Lever 136 will be in the position shown in Fig. 6. Shifter rod 124 will be pulled outwardly, that is to the right, from the position shown in Fig. 15, and shifter rod 126 will be pushed inwardly, that is to the left, from the position shown in Fig. 16. Lever 83 will be shifted to the right from the position shown in Fig. 1 in full lines, to the position indicated by dotted lines. With the levers in these positions, the gears and clutches will be in the positions shown in Figs. 6, 11 and 18 respectively.

5$^D$ is secured in the following manner:

Lever 136 will be in the position shown in Fig. 6. Shifter rod 124 will be pulled outwardly, that is to the right, from the position shown in Fig. 15, and shifter rod 126 will be pushed inwardly, that is to the left, from the position shown in Fig. 16. Lever 102 will be shifted to the left from the position shown in Fig. 1 in full lines, to the position indicated by dotted lines. With the levers in these positions, the gears and clutches will be in the positions shown in Figs. 6, 11 and 17 respectively.

5$^U$ is secured in the following manner:

Lever 136 will be in the position shown in Fig. 6. Shifter rod 124 will be pulled outwardly, that is to the right, from the position shown in Fig. 15, and shifter rod 126 will be pushed inwardly, that is to the left, from the position shown in Fig. 16. Lever 102 will be shifted to the right from the position shown in Fig. 1 in full lines, to the position indicated by dotted lines. With the levers in these positions, the gears and clutches will be in the positions shown in Figs. 6, 11 and 18 respectively.

6$^L$ is secured in the following manner:

Lever 136 will be in the position shown in Fig. 6. Shifter rod 124 will be pushed inwardly, that is to the left, from the position shown in Fig. 15, and shifter rod 126 will be pushed inwardly, that is to the left, from the position shown in Fig. 16. Lever 83 will be shifted to the left from the position shown in Fig. 1 in full lines, to the position indicated by dotted lines. With the levers in these positions, the gears and clutches will be in the positions shown in Figs. 6, 12 and 17 respectively.

6$^R$ is secured in the following manner:

Lever 136 will be in the position shown in Fig. 6. Shifter rod 124 will be pushed inwardly, that is to the left, from the position shown in Fig. 15, and shifter rod 126 will be pushed inwardly, that is to the left, from the position shown in Fig. 16. Lever 83 will be shifted to the right from the position shown in Fig. 1 in full lines, to the position indicated by dotted lines. With the levers in these positions, the gears and clutches will be in the positions shown in Figs. 6, 12 and 18 respectively.

6$^D$ is secured in the following manner:

Lever 136 will be in the position shown in Fig. 6. Shifter rod 124 will be pushed inwardly, that is to the left, from the position shown in Fig. 15, and shifter rod 126 will be pushed inwardly, that is to the left, from the position shown in Fig. 16. Lever 102 will be shifted to the left from the position shown in Fig. 1 in full lines, to the position indicated by dotted lines. With the levers in these positions, the gears and clutches will be in the positions shown in Figs. 6, 12 and 17 respectively.

6$^U$ is secured in the following manner:

Lever 136 will be in the position shown in Fig. 6. Shifter rod 124 will be pushed inwardly, that is to the left, from the position shown in Fig. 15, and shifter rod 126 will be pushed inwardly, that is to the left, from the position shown in Fig. 16. Lever 102 will be shifted to the right from the position shown in Fig. 1 in full lines, to the position indicated by dotted lines. With the levers in these positions, the gears and clutches will be in the positions shown in Figs. 6, 12 and 18, respectively.

7$^L$ is secured in the following manner:

Lever 136 will be in the position shown in Fig. 6. Shifter rod 124 will be pulled outwardly, that is to the right, from the position shown in Fig. 15, and shifter rod 126 will be pulled outwardly, that is to the right, from the position shown in Fig. 16. Lever 83 will be shifted to the left from the position shown in Fig. 1 in full lines, to the position indicated by dotted lines. With the levers in these positions, the gears and clutches will be in the positions shown in Figs. 6, 13 and 17 respectively.

7$^R$ is secured in the following manner:

Lever 136 will be in the position shown in Fig. 6. Shifter rod 124 will be pulled outwardly, that is to the right, from the position shown in Fig. 15, and shifter rod 126 will be pulled outwardly, that is to the right, from the position shown in Fig. 16. Lever 83 will be shifted to the right from the position shown in Fig. 1 in full lines, to the position indicated by dotted lines. With the levers in these positions, the gears and clutches will be in the positions shown in Figs. 6, 13 and 18 respectively.

7$^D$ is secured in the following manner:

Lever 136 will be in the position shown in Fig. 6. Shifter rod 124 will be pulled outwardly, that is to the right, from the position shown in Fig. 15, and shifter rod 126 will be pulled outwardly, that is to the right, from the position shown in Fig. 16. Lever 102 will be shifted to the left from the position shown in Fig. 1 in full lines to the position indicated by dotted lines. With the levers in these positions, the gears and clutches will be in the positions shown in Figs. 6, 13 and 17 respectively.

7$^U$ is secured in the following manner:

Lever 136 will be in the position shown in Fig. 6. Shifter rod 124 will be pulled outwardly, that is to the right, from the position shown in Fig. 15, and shifter rod 126 will be pulled outwardly, that is to the right, from the position shown in Fig. 16. Lever 102 will be shifted to the right from the position shown in Fig. 1 in full lines, to the position indicated by dotted lines. With the levers in these positions, the gears and clutches will be in the positions shown in Figs. 6, 13 and 18 respectively.

8$^L$ is secured in the following manner:

Lever 136 will be in the position shown in Fig. 6. Shifter rod 124 will be pushed inwardly, that is to the left, from the position shown in Fig. 15, and shifter rod 126 will be pulled outwardly, that is to the right, from the position shown in Fig. 16. Lever 83 will be shifted to the left from the position shown in Fig. 1 in full lines, to the position indicated by dotted lines. With the levers in these positions, the gears and clutches will be in the positions shown in Figs. 6, 14 and 17 respectively.

8$^R$ is secured in the following manner:

Lever 136 will be in the position shown in Fig. 6. Shifter rod 124 will be pushed inwardly, that is to the left, from the position shown in Fig. 15, and shifter rod 126 will be pulled outwardly that is to the right, from the position shown in Fig. 16. Lever 83 will be shifted to the right from the position shown in Fig. 1 in full lines, to the position indicated by dotted lines. With the levers in these positions, the gears and clutches will be in the positions shown in Figs. 6, 14 and 18 respectively.

8$^D$ is secured in the following manner:

Lever 136 will be in the position shown in Fig. 6. Shifter rod 124 will be pushed inwardly, that is to the left, from the position shown in Fig. 15, and shifter rod 126 will be pulled outwardly, that is to the right, from the position shown in Fig. 16. Lever 102 will be shifted to the left from the position shown in Fig. 1 in full lines, to the position indicated by dotted lines. With the levers in these positions the gears and clutches will be in the positions shown in Figs. 6, 14 and 17 respectively.

8$^U$ is secured in the following manner:

Lever 136 will be in the position shown in Fig. 6. Shifter rod 124 will be pushed inwardly, that is to the left, from the position shown in Fig. 15, and shifter rod 126 will be pulled outwardly that is to the right, from the position shown in Fig. 16. Lever 102 will be shifted to the right from the position shown in Fig. 1 in full lines, to the position indicated by dotted lines. With the levers in these positions the gears and clutches will be in the positions shown in Figs. 6, 14 and 18 respectively.

9$^L$ is secured in the following manner:

Lever 136 will be in the position shown in Fig. 7. Shifter rod 124 will be pulled outwardly, that is to the right, from the position shown in Fig. 15, and shifter rod 126 will be pushed inwardly, that is to the left, from the position shown in Fig. 16. Lever 83 will be shifted to the left from the position shown in Fig. 1 in full lines to the position indicated by dotted lines. With the levers in these positions, the gears and clutches will be in the positions shown in Figs. 7, 11 and 17 respectively.

9$^R$ is secured in the following manner:

Lever 136 will be in the position shown in Fig. 7. Shifter rod 124 will be pulled outwardly, that is to the right, from the position shown in Fig. 15, and shifter rod 126 will be pushed inwardly, that is to the left, from the position shown in Fig. 16. Lever 83 will be shifted to the right from the position shown in Fig. 1 in full lines to the position indicated by dotted lines. With the levers in these positions, the gears and clutches will be in the positons shown in Figs. 7, 11 and 18 respectively.

9$^D$ is secured in the following manner:

Lever 136 will be in the position shown in Fig. 7. Shifter rod 124 will be pulled outwardly, that is to the right, from the position shown in Fig. 15, and shifter rod 126 will be pushed inwardly, that is to the left, from the position shown in Fig. 16. Lever 102 will be shifted to the left from the position shown in Fig. 1 in full lines, to the position indicated by dotted lines. With the levers in these positions, the gears and clutches will be in the positions shown in Figs. 7, 11 and 17 respectively.

9$^U$ is secured in the following manner:

Lever 136 will be in the position shown in Fig. 7. Shifter rod 124 will be pulled outwardly, that is to the right, from the position shown in Fig. 15, and shifter rod 126 will be pushed inwardly, that is to the left, from the position shown in Fig. 16. Lever 102 will be shifted to the right from the position shown in Fig. 1 in full lines to the position indicated by dotted lines. With the levers in these positions, the gears and clutches will be in the positions shown in Figs. 7, 11 and 18 respectively.

$10^L$ is secured in the following manner:

Lever 136 will be in the position shown in Fig. 7. Shifter rod 124 will be pushed inwardly, that is to the left, from the position shown in Fig. 15, and shifter rod 126 will be pushed inwardly, that is to the left, from the position shown in Fig. 16. Lever 83 will be shifted to the left from the position shown in Fig. 1 in full lines to the position indicated by dotted lines. With the levers in these positions, the gears and clutches will be in the positions shown in Figs. 7, 12 and 17 respectively.

$10^R$ is secured in the following manner:

Lever 136 will be in the position shown in Fig. 7. Shifter rod 124 will be pushed inwardly, that is to the left, from the position shown in Fig. 15, and shifter rod 126 will be pushed inwardly, that is to the left, from the position shown in Fig. 16. Lever 83 will be shifted to the right from the position shown in Fig. 1 in full lines to the position indicated by dotted lines. With the levers in these positions the gears and clutches will be in the positions shown in Figs. 7, 12 and 18 respectively.

$10^D$ is secured in the following manner:

Lever 136 will be in the position shown in Fig. 7. Shifter rod 124 will be pushed inwardly, that is to the left, from the position shown in Fig. 15, and shifter rod 126 will be pushed inwardly, that is to the left, from the position shown in Fig. 16. Lever 102 will be shifted to the left from the position shown in Fig. 1 in full lines to the position indicated by dotted lines. With the levers in these positions the gears and clutches will be in the positions shown in Figs. 7, 12 and 17 respectively.

$10^U$ is secured in the following manner:

Lever 136 will be in the position shown in Fig. 7. Shifter rod 124 will be pushed inwardly, that is to the left, from the position shown in Fig. 15, and shifter rod 126 will be pushed inwardly, that is to the left, from the position shown in Fig. 16. Lever 102 will be shifted to the right from the position shown in Fig. 1 in full lines, to the position indicated by dotted lines. With the levers in these positions, the gears and clutches will be in the positions shown in Figs. 7, 12 and 18 respectively.

$11^L$ is secured in the following manner:

Lever 136 will be in the position shown in Fig. 7. Shifter rod 124 will be pulled outwardly, that is to the right, from the position shown in Fig. 15, and shifter rod 126 will be pulled outwardly, that is to the right, from the position shown in Fig. 16. Lever 83 will be shifted to the left from the position shown in Fig. 1 in full lines to the position indicated by dotted lines. With the levers in these positions, the gears and clutches will be in the positions shown in Figs. 7, 13 and 17 respectively.

$11^R$ is secured in the following manner:

Lever 136 will be in the position shown in Fig. 7. Shifter rod 124 will be pulled outwardly, that is to the right, from the position shown in Fig. 15, and shifter rod 126 will be pulled outwardly, that is to the right, from the position shown in Fig. 16. Lever 83 will be shifted to the right from the position shown in Fig. 1 in full lines to the position indicated by dotted lines. With the levers in these positions, the gears and clutches will be in the positions shown in Figs. 7, 13 and 18 respectively.

$11^D$ is secured in the following manner:

Lever 136 will be in the position shown in Fig. 7. Shifter rod 124 will be pulled outwardly, that is to the right, from the position shown in Fig. 15, and shifter rod 126 will be pulled outwardly, that is to the right, from the position shown in Fig. 16. Lever 102 will be shifted to the left from the position shown in Fig. 1 in full lines, to the position indicated by dotted lines. With the levers in these positions, the gears and clutches will be in the positions shown in Figs. 7, 13 and 17 respectively.

$11^U$ is secured in the following manner:

Lever 136 will be in the position shown in Fig. 7. Shifter rod 124 will be pulled outwardly, that is to the right, from the position shown in Fig. 15, and shifter rod 126 will be pulled outwardly, that is to the right, from the position shown in Fig. 16. Lever 102 will be shifted to the right from the position shown in Fig. 1 in full lines to the position indicated by dotted lines. With the levers in these positions, the gears and clutches will be in the positions shown in Figs. 7, 13 and 18 respectively.

$12^L$ is secured in the following manner:

Lever 136 will be in the position shown in Fig. 7. Shifter rod 124 will be pushed inwardly, that is to the left, from the position shown in Fig. 15, and shifter rod 126 will be pulled outwardly, that is to the right, from the position shown in Fig. 16. Lever 83 will be shifted to the left from the position shown in Fig. 1 in full lines to the position indicated by dotted lines. With the levers in these positions the gears and clutches will be in the positions shown in Figs. 7, 14 and 17 respectively.

$12^R$ is secured in the following manner:

Lever 136 will be in the position shown in Fig. 6. Shifter rod 124 will be pushed inwardly, that is to the left, from the position shown in Fig. 15, and shifter rod 126 will be pulled outwardly that is to the right, from the position shown in Fig. 16. Lever 83 will be shifted to the right from the position shown in Fig. 1 in full lines to the position indicated by dotted lines. With the levers in these positions the gears and clutches will be in the positions shown in Figs. 7, 14 and 18 respectively.

12$^D$ is secured in the following manner:

Lever 136 will be in the position shown in Fig. 6. Shifter rod 124 will be pushed inwardly, that is to the left, from the position shown in Fig. 15, and shifter rod 126 will be pulled outwardly that is to the right, from the position shown in Fig. 16. Lever 102 will be shifted to the left from the position shown in Fig. 1 in full lines, to the position indicated by dotted lines. With the levers in these positions, the gears and clutches will be in the positions shown in Figs. 7, 14 and 17 respectively.

12$^U$ is secured in the following manner:

Lever 136 will be in the position shown in Fig. 6. Shifter rod 124 will be pushed inwardly, that is to the left, from the position shown in Fig. 15, and shifter rod 126 will be pulled outwardly that is to the right, from the position shown in Fig. 16. Lever 102 will be shifted to the right from the position shown in Fig. 1 in full lines to the position indicated by dotted lines. With the levers in these positions the gears and clutches will be in the positions shown in Figs. 7, 14 and 18 respectively.

The power for the rapid traverse which is always operated at the same rate of speed and is brought into the box through shaft B, is converted into upward, downward, left or right movement or two of these movements simultaneously by adjustment of the mechanism on shafts 48, 68 and 91, in forward movement without and in reverse movement with the cooperation of the gear 71 on stud 73.

In all the four rapid traverse movements and their combinations, lever 54 will be in the position shown in Fig. 20 in full lines and Fig. 21, in which the drive is from the shaft B and not from the shafts A and 38. Shifter rods 124 and 126 and lever 136 may be in any position.

Rapid traverse movement of the cutting head to the left, which is considered a forward movement, is secured in the following manner:

Lever 83 will be shifted from the position shown in full lines in Fig. 1, to the position shown in dotted lines to the left, which will place the gears and clutches on shaft 68 in the positions shown in Fig. 17.

Rapid traverse movement of the cutting head downwardly which is considered a forward movement, is secured in the following manner:

Lever 102 will be shifted from the position shown in full lines in Fig. 1, to the position shown in dotted lines to the left, which will place the gears and clutches on shaft 91 in the positions shown in Fig. 17.

Rapid traverse movement of the cutting head to the right, which is considered a reverse movement, is secured in the following manner:

Lever 83 will be shifted from the position shown in full lines in Fig. 1, to the position shown in dotted lines to the right, which will place the gears and clutches on shaft 68 in the positions shown in Fig. 18.

Rapid traverse movement of the cutting head upwardly which is considered a reverse movement, is secured in the following manner:

Lever 102 will be shifted from the position shown in full lines in Fig. 1, to the position shown in dotted lines to the right, which will place the gears and clutches on shaft 91 in the positions shown in Fig. 18.

Levers 83 and 102 may both be shifted from the positions shown in dotted lines to the left in Fig. 1, thereby producing a diagonal movement downwardly and to the left of the cutting head.

If lever 83 be shifted to the right from the positions shown in full lines to the positions shown in dotted lines in Fig. 1, and the lever 102 is shifted to the left from the positions shown in full lines to the positions shown in dotted lines, a diagonal movement downwardly and to the right will be obtained.

If levers 83 and 102 both be shifted to the right from the positions shown in full lines in Fig. 1 to the positions shown in dotted lines to the right, a movement upwardly and to the right will be obtained.

If lever 83 be shifted to the left and lever 102 to the right from the positions shown in full lines in Fig. 1, to the positions shown in dotted lines, a diagonal movement upwardly and to the left will be obtained.

Referring now to the drawings, Figs. 29 to 33 inclusive, it will be seen that in the modification no change is made in any of the mechanism which is used exclusively in connection with the feed and no change is made in shafts 68 and 91 and stud 73 and their equipment. The only change is in shaft 48 and its equipment and the mechanism for bringing the power from shaft B into the box. The shaft 48 in the form of the mechanism first described is replaced by shaft 148.

Splined to the power traverse driving shaft B is a bevel pinion 146 mounted in bracket 3, in any convenient manner.

The pinion 146 is constantly in mesh with bevel gear 55 which is fixed to the shaft 148 by the key 56.

Large gear 59, small gear 60 and clutch jaw 61 are made unitary and fitted with bushing 62, all as shown in the form of the apparatus first described, and this assembly is normally loose on shaft 148. Gears 43 and 44 are adapted to mesh with gears 60 and 59 respectively on shaft 148.

A clutch member 147 mounted in a suitable bearing at its outer end has jaws 149 on its inner end, and is secured to the shaft 148 by key 150.

Forward driving gear 161 and reverse driving gear 162 are made unitary provided with clutch jaws 163 on one end and clutch jaws 164 on the other end, has an annular shifter groove 165 and a bushing 166, and this assembly is normally loose on shaft 148 and is axially adjustable thereon by means of shifter yoke 67, operated by lever 54 and its connecting mechanism. It will be understood that clutch jaw 61 is adapted to mesh with clutch jaw 163, that clutch jaw 164 is adapted to mesh with clutch jaw 149, that gear 161 is constantly in mesh with gear 69, and that gear 162 is constantly in mesh with gear 71.

Referring particularly to Figs. 30, 31, 32 and 33, lever 54 is fixed to the combined feed and power traverse shifter rocker shaft 114 by key 167, and nut 168.

Lever 54 is shown in neutral position in Fig. 1 and by shifting it to the right to the position shown in Fig. 1 in dotted lines to the right, and in Fig. 30, in dotted lines, the shaft 114 is rotated a part turn to which gear segment 121 is fixed by pin 122. The teeth of the gear segment 121 coact with the teeth on the shifter rod 123, pushing said rod to the right to the position shown in Fig. 31, causing the yoke 67 through the groove 165 to shift its assembled elements to the right, bringing clutch jaws 164 and 149 into engaging contact and causing said assembly to rotate with the shaft 148, thus engaging the power traverse, all as shown in Fig. 31.

By referring to Fig. 32, it will be seen that shifting the lever 54 to the left to the position shown in Fig. 1, in dotted lines to the left, and in Fig. 30, in full lines, the assembly of elements controlled by the shifter fork 67 will be moved to the left so that the clutch jaws 61 and 163 will engage causing the assembly comprising gears 161—162 to be rotated through the assembly comprising gears 59—60 and thus engage the feed.

While the invention has been shown and described as applied to a particular type of machine tool, it may be used with many machine tools and especially those having a rotating spindle.

Although preferred forms of the invention have been shown and described, it will be understood that a mechanic working within the scope of what is claimed, may make changes without departing from the spirit of the invention.

I claim as my invention and desire to secure by Letters Patent of the United States:

A gear box; combined feed and rapid traverse mechanism in said box for operating a cutting head of a machine tool comprising in combination; a shaft and pinion through which power is brought to the box; a shaft and gear taking power into the box from said pinion; feed gears on said second shaft; a third shaft and feed gears thereon adapted to selectively coact with the gears on said second shaft; a fourth shaft and feed gears thereon adapted to selectively coact with gears on said second shaft and gears on said third shaft; a fifth shaft and pinion through which power is brought to the box; a sixth shaft and a gear taking power from the pinion on said fifth shaft, feed gears on said sixth shaft adapted to selectively coact with gears on said fourth shaft, and other gears on said sixth shaft; seventh and eighth shafts and gears thereon adapted to selectively coact with gears on said sixth shaft, and a gear on the seventh and another on the eighth shaft for taking power out of the box, said seventh and eighth shafts and their equipment being similar in all respects; a stud; back gear on said stud; said back gear adapted to coact with a gear on said sixth shaft, one on said seventh shaft, and one on said eighth shaft; said second, third, fourth, sixth, seventh and eighth shafts and said stud being parallel with each other, and means for operatively engaging gears on said shaft.

In testimony whereof I have hereunto set my hand.

EDWARD A. MULLER.